Feb. 1, 1949.  G. H. FRITZINGER  2,460,686
ELECTRICAL INSTRUMENT
Filed Jan. 4, 1944
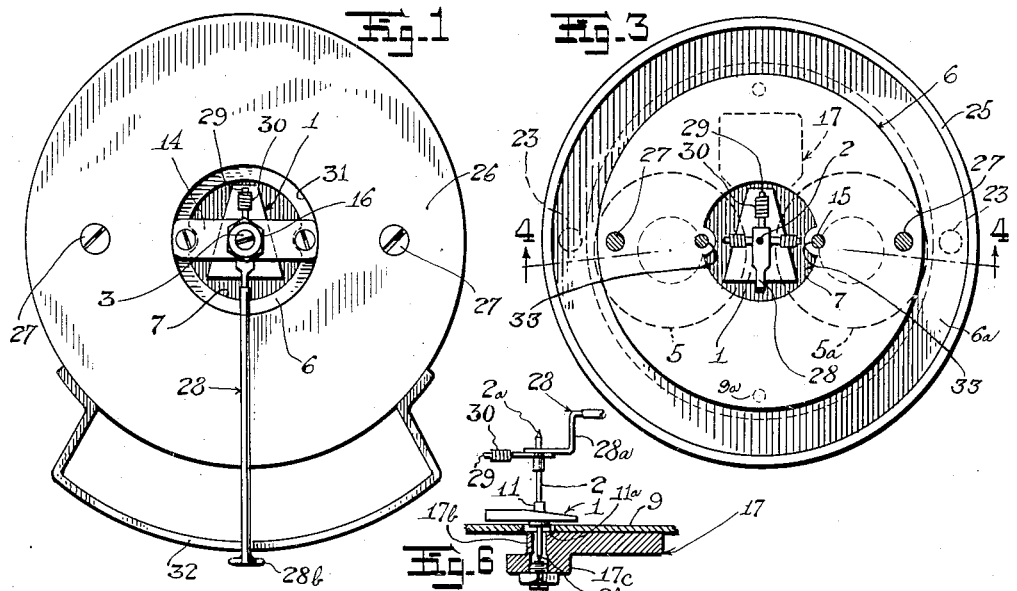
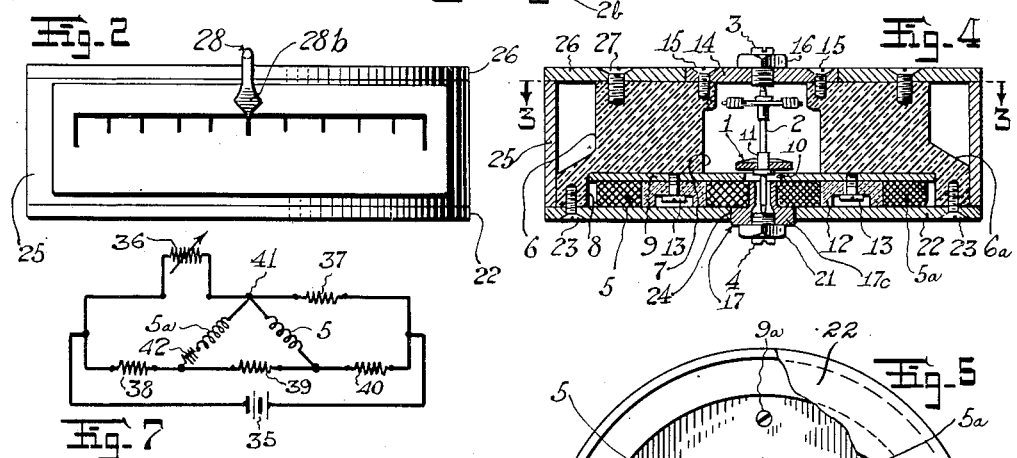
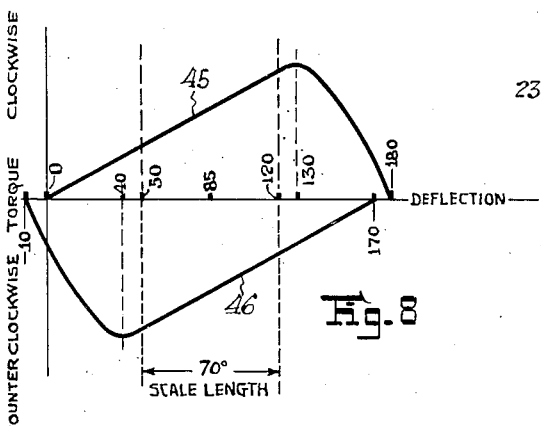
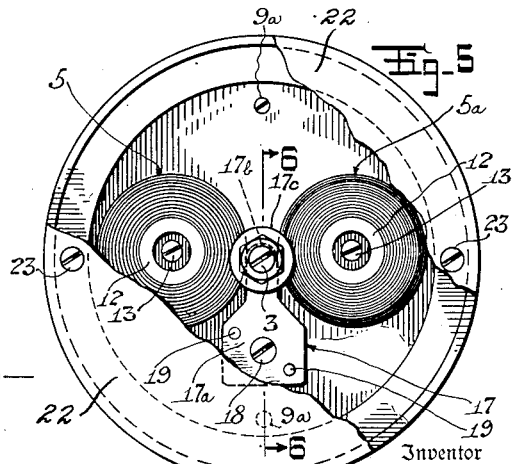
Inventor
George H. Fritzinger
By Henry Lanahan
Attorney Patented Feb. 1, 1949

2,460,686

UNITED STATES PATENT OFFICE 2,460,686

ELECTRICAL INSTRUMENT

George H. Fritzinger, West Orange, N. J., assignor to Thomas A. Edison, Incorporated, West Orange, N. J., a corporation of New Jersey Application January 4, 1944, Serial No. 516,947

8 Claims. (Cl. 171—95)

This invention relates to the class of electrical instruments which utilize permanent magnets, and has especially useful application to ratiometers and D.-C. measuring instruments of the moving magnet type.

The broader aspects of the present invention are disclosed and claimed in my pending application Serial No. 492,195, filed June 23, 1943, which application is now abandoned and continuation-in-part application Serial No. 569,083 filed December 20, 1944, in its stead, now Patent Number 2,446,579 issued August 10, 1948. In that application there is disclosed the broad principle of controlling the torque reaction characteristic between a magnet and relatively pivoted coil, particularly for the purpose of attaining an even or uniform scale calibration, by asymmetrically shaping the magnet and by offsetting the coil each with respect to the relative pivot axis between the coil and magnet.

In the present invention that principle is applied to a new and different organization of meter elements to attain an instrument having a very short length along the pivot axis of the meter. The primary objective for reducing this dimension of the meter is to permit a more compact mounting of a plurality of such instruments on a panel to conserve panel space, this being particularly important in present-day aircraft which require numerous indicating instruments for their proper control and manipulation.

It is an object of my invention to provide an instrument of the character above described which is very simple in construction, easy to assemble, and easy to disassemble for servicing and repair.

It is another object to provide such an instrument wherein the several components are very simple in form and construction and economical to manufacture.

It is another object to provide such an instrument which has a uniform scale calibration.

It is another object to provide an efficient arrangement of such an instrument having a strong operating torque.

It is another object to provide a novel arrangement of pivoted magnet and stationary field coil giving a linear torque characteristic over a wide angular range.

It is another object to provide a novel and improved form of instrument adapted to operate efficiently as a ratiometer.

Other and allied objects and features of my invention will more fully appear from the following description and the appended claims.

My invention is herein particularly shown and described in terms of a ratiometer, but it will be understood that the embodiment herein shown and described is illustrative and not limitative of my invention.

In the description of my invention reference is had to the accompanying drawings, of which:

Figure 1 is a top end view (a view along the pivot axis) of a ratiometer according to my invention;

Figure 2 is a side view of that ratiometer showing the scale in elevation;

Figure 3 is a sectional view taken substantially on the line 3—3 of Figure 4;

Figure 4 is a substantially axially sectional view taken on the line 4—4 of Figure 3;

Figure 5 is a bottom end view wherein a portion of the bottom plate is partially broken away for the better illustration of the interior parts;

Figure 6 is a fractional, sectional view taken substantially on the line 6—6 of Figure 5;

Figure 7 is a schematic view of a circuit arrangement for the present instrument when operating as a ratiometer; and Figure 8 is a set of curves showing approximately the torque characteristics between the pivoted magnet and respective field coils for the present ratiometer.

It will be understood that the reference in the accompanying drawings to the meter as having top and bottom sides is a purely arbitrary one used only for convenience in description of the meter, for the meter may be oriented in operation not only as shown in Figuers 1 and 2— that is, with its pivot axis vertical—but also, and perhaps more commonly, with its pivot axis horizontal so that the scale will lie vertically. In any case, however, it will be seen that a plurality of such meters may be placed end to end in stacked relationship, with their pivot axes in line, so that the scale of each instrument will utilize a minimum space and there will be little waste space between scales to effect a great conservation in overall panel space.

The ratiometer shown in the accompanying drawings comprises a bar magnet 1 carried by a shaft 2 in a position wherein the central longitudinal axis of the magnet extends through and is transverse to the shaft. In the ends of the shaft 2 are pivots 2a and 2b which engage top and bottom jewel screws 3 and 4 to permit pivotal movement of the magnet in relation to a pair of identical stationary coils 5 and 5a. These are thin, flat coils mounted so that their medial planes coincide and are at right angles to the shaft or pivot axis of the magnet, or in other words, so that their pole axes are parallel to the pivot axis. The coils are offset from the pivot axis and spaced thereabout, but are located closely adjacent to the pivot axis and to the underside of the magnet, in overlapping relationship with the latter, so that the coils and magnet will be closely magnetically coupled. To increase the coupling of the magnet with the coils, there is a high permeable flat magnetic disk 22 placed directly below the coils at right angles to the pivot axis as is hereinafter more fully explained.

The frame structure for the meter comprises a cylindrical member 6 made, for example, of a moldable plastic material. This frame member has a central cylindrical bore 7 and has a wide shallow recess 8 at the bottom into which the bore extends, the recess being shown purely by way of example as being also cylindrical. Fitting the inner wall of this recess is a thin disk 9 held in place by screws 9a. This disk is made of a highly conductive material such as of copper, and serves as a damping means for the magnet. The disk closes the inner end of the bore except for a central opening 10 therein through which passes the shaft 2. The magnet 1 is located at the inner end of the bore with its bottom surface parallel to and separated from the disk only by a minimum practical clearance permitting free pivotal movement of the magnet— typically a clearance of the order of .010". (Because the magnet is held to the shaft 2 by being fitted onto the bottom flange 11a of a bushing 11 which is press-fitted onto the shaft, the opening 10 in the copper disk is enlarged to clear the flange and permit the close positioning of the magnet to the disk as explained.) The coils 5 and 5a are located in the cylindrical recess 8 against the bottom side of the disk 9. Preferably these coils are wound on core pieces 12, such as of Bakelite, which form an integral part of each coil structure, the coils per se being wound with a suitable cement or adhesive such as cellulose acetate or "Glyptal" and then baked to set the adhesive and render the coils self-supporting. The core pieces have center holes received by screws 13 which thread through the copper disk into the body of the frame 6 to hold the coils in place, the core pieces being countersunk so that the heads of the screws 13 will not project beyond the sides of the coils.

The upper jewel screw is threaded into a cross bar 14 which diametrically bridges the upper end of the cylindrical bore 7 and is held to the frame member 6 by screws 15, the jewel screw being held in its adjusted positions by means of a lock nut 16. The bottom jewel screw is carried by a bracket 17. This bracket has a block-shaped portion 17a held fixedly against the disk 9 by a screw 18 and locating pins 19. This block portion 17a is tapered in width at one end to form a thin-walled, semi-cylindrical portion 17b; this portion has a central aperture 20 located directly at the pivot axis of the meter and through which passes the shaft 2. Concentric with the semi-cylindrical portion 17b is an outer circular head 17c of larger diameter which is integral with the bracket. The aperture 20 above mentioned continues on through this head but is here enlarged in diameter and threaded to receive the bottom jewel screw 4. This jewel screw projects below the head 17c and is locked in place by a lock nut 21. The portions 17a and 17b of the bracket 17 are coplanar and lie within the recess 8 of the frame member 6, but the head 17c thereof projects below the recess as is shown in Figure 4. The function of the semi-cylindrical portion 17b is to serve as an abutment against which the peripheries of the coils 5 and 5a may be pressed and the coils be thus located at a prescribed minimum clearing distance from the shaft 2, it being understood that the apertures in the core pieces 12 of the core structures will be slightly enlarged to provide for variations, within prescribed tolerance limits, in the radial dimensions of the coils whereby to permit the coils to be positioned in the manner described.

The case or shield for the instrument comprises the aforementioned bottom disk 22 which is held by screws 23 against the outer flange 6a of the frame member 6 that surrounds the recess 8, a surrounding tubular shield member 25 which is held concentric to the pivot axis by the frame member 6 and the bottom shield disk 22, and a top shield disk 26 which is held clamped against the top edge of the tubular shield 25 in normal relation to the pivot axis by screws 27 which thread into the frame member 6.

The bottom disk 22 is closely positioned to the magnet, being spaced therefrom by the minimum clearance required between the magnet and copper disk and the thicknesses of the copper disk and field coils required for efficient design of the meter, but the tubular and top shields 25 and 26 are relatively distantly spaced from the magnet, preferably by a multiple times greater distance, a typical spacing of the top shield 26 —which is the closer of the shields 25 and 26 to the magnet—being approximately three times the spacing of the bottom shield 22 from the magnet. The bottom shield accordingly attracts to it most of the flux emanating from the magnet and directs this flux through the copper disk 9—where it generates eddy currents, as the magnet turns, to damp the movement of the magnet—and past the coils where it serves as useful flux, the term "useful flux" being used to refer to the flux of the magnet which reacts with the flux from the coils to generate driving torque. In order, however, that the central portion of the bottom disk 22 at the pivot axis will not act as a magnetic shunt on the magnet to reduce the useful flux of the magnet, the disk is provided with a central circular opening 24 equal in diameter typically to a major fraction of the length of the magnet. This hole is accurately centered relative to the pivot axis by the engagement therewith of the circular head 17c of the bracket 17, this accurate centering of the hole being important so that no fixed magnetic bias is imposed on the magnet by the bottom shield 22.

Since the bottom disk 22 receives most of the flux emanating from the magnet, it is important that it be made of a high permeable low hysteresis material such as that known commercially as "Mumetal" or "Permalloy." The other shield means 25 and 26, being relatively distantly spaced from the magnet and receiving relatively little of the magnet flux, are permitted advantageously in the present meter design to be made of less critical and less expensive shielding materials such as of soft iron or that known commercially as "Armco."

The indicating means for the meter comprises a pointer 28 secured to the upper portion of the shaft 2 and provided with the usual cross arms 29 and adjustable balance weights 30. The pointer has an offset portion 28a by which it extends outwardly from the case through an opening 31 in the top shield plate 26. From this offset portion, the pointer extends radially outwardly to indicate angular positions of the magnet relative to a scale 32. In the present style of instrument having an axially short dimension, the face of the scale 32 is curved arcuately about the pivot axis of the meter in a position beyond the tubular shield 25 between the top and bottom plates of the instrument case, and the tip 28b of the pointer is bent downwardly so as to overlie the scale as shown in Figure 2, the advantage in so shaping and positioning the scale relative to the meter being in the reduction in panel space which the scale requires.

The opening 31 is made circular and concentric to the pivot axis of the meter so that the top shield plate 26 will not impose any magnetic bias on the magnet 1. This opening exposes the cross bar 14 to permit easy assembly and disassembly of the meter, but the cross bar is made as short as possible to permit the opening to be made sufficiently small so that the top shield plate will serve to effectively shield the magnet from stray magnetic fields at the top of the instrument. To meet these objectives, the bore 7 is made just larger than the radius of the magnet 1 by a suitable clearing distance, and inwardly projecting lugs 38 are provided within the bore 7 to form supports for the cross bar 14 and into which the screws 15 may thread.

The rotor of the instrument—which comprises the magnet 1, shaft 2 and pointer 28—is readily independently removable from the instrument to permit replacement of the pivots 2a and 2b without disturbing the mounting of the field coils. While the rotor may be removed simply by first removing the cross bar 14 and then lifting the rotor axially out of the case through the opening 31, it is preferred that the passing of the magnet through the opening 31 be avoided in the removal of the rotor since, unless particular care is exercised, the magnet may be attracted magnetically into contact with the edge of the top shield plate 26 as it is passed through the opening to cause the magnetized condition of the magnet to be disturbed and localized portions of the top shield plate to become magnetized with a resultant change in the calibration of the meter. Such removal of the rotor from the instrument without passing the magnet through the opening 31 is readily carried out by first removing the cross bar 14, next removing the screws 27 which hold the top shield plate 26 in place, and then lifting both the top shield plate and rotor from the instrument case while retaining the rotor and shield plate in their normal physical relationship by pressing the pointer against the top face of the shield plate. After both the top shield plate and rotor are thus removed the rotor is separated from the shield plate by passing the pointer through the opening 31.

The magnet 1 is magnetized along its central longitudinal axis through its pivot center, which axis then becomes also its magnetic axis. The magnetizing is done by clamping the magnet between a pair of flat parallel pole pieces, generating a magnetic field between the pole pieces sufficiently strong to saturate the magnet, and thereafter removing the pole pieces from the magnet, care being taken in the removal of each pole piece to break all points of contact at the same time.

When either field coil 5 or 5a is current-energized, one pole end or the other of the magnet will be attracted toward that coil, depending upon the relative polarization of the coil, and the magnetic axis of the magnet will be directed toward the axis of the coil; this position of the magnet relative to the coil is herein termed its "zero" position. If the current-energization is held fixed and the magnet is forcibly deflected from zero position, the torque reaction of the coil on the magnet will vary with the different positions of the magnet; a plot of this torque reaction against deflection is herein termed the "torque deflection characteristic." The shape of this torque deflection characteristic is very important for it determines the scale calibration for the meter both when the meter is used as a ratiometer and as a D.-C. measuring instrument.

Particularly to illustrate the significance of the torque deflection characteristic in a preferred application of the present meter as a ratiometer, I herein show in Figure 7 a preferred example of ratiometer bridge circuit for use with the present meter, this bridge circuit being the one described and claimed in the pending application of Frederick G. Kelly, Serial No. 450,222, filed July 8, 1942 (now Patent No. 2,362,562) and assigned to the assignee of the present invention. This bridge circuit has two branches connected in parallel to each other and each energized by a common source of current, typically a battery 35. One branch serially includes a variable resistance 36 to be measured, and the fixed resistance 37, and the other branch serially includes three fixed resistances 38, 39 and 40. The coils 5 and 5a are connected from the junction point 41 between resistances 36 and 37 of the first branch to the respective extremities of the middle resistance 39 in the second branch. As the resistance 36 is varied the absolute potential of the junction point 41 will vary relative to the absolute potentials present at the extremities of the resistance 39, with the result that the voltage drop across one field coil will increase while that across the other will decrease. Accordingly, when the resistance 36 has a prescribed lower value, the voltage of junction point 41 will correspond exactly with that of the junction between resistances 38 and 39, leaving zero voltage across one coil and maximum voltage across the other coil. For this condition the magnet will assume the position wherein its magnetic axis is aligned with that one coil. Similarly, when the resistance 36 has a prescribed higher value, only the other coil will be energized and the magnet will assume a position wherein its magnetic axis will be aligned with that coil. For intermediate values of resistance 36, current will flow in both coils and the ratio of the currents in the coils will vary as resistance 36 varies, with the result that the magnet will assume different intermediate positions wherein the opposing torques of the two coils on the magnet are always in balance. In order that the pointer will register with the low end portion of the scale—the left end of the scale as it appears in Figure 2—for low values of resistance 36, and at the high end of the scale for higher values of resistance 36, the coils 5 and 5a are located at the left and right sides of the pivot axis of the meter as it appears in Figure 3 and the coils are connected respectively to the right and left extremities of the resistance 39 in the bridge circuit of Figure 7.

It will be understood that upon the scale being properly calibrated the pointer will indicate directly on the scale the different values of the resistance 36, and that the pointer indications will not be affected by variations in the voltage of the battery 35, for variation in battery voltage will produce like variation of current in each coil without changing the ratio of the currents in the two coils. While the ratiometer system here shown is thus basically a resistance measuring system, it will be understood that the resistance 36 may be varied according to variations in any condition to be measured and that the meter may be calibrated directly in terms of that condition. One such common application of the present ratiometer system is as a temperature measuring device on aircraft. In this application the resistance 36 comprises a resistance bulb that is immersed in the medium whose temperature is to be measured and whose resistance varies according to that temperature, a preferred example of such bulb being that disclosed in the pending application of Frederick G. Kelly, Serial No. 493,947, filed July 8, 1943 (now Patent No. 2,398,892) and assigned also to the assignee of the present invention.

The resistance of the bulb here specifically referred to is approximately 68 ohms at minus 70° C. and 152 ohms at 150° C. Within this range, however, the bulb does not have a truly linear characteristic—and this is typical of resistance bulbs generally—for the resistance of the bulb increases at a faster rate in response to a given temperature increase at high temperatures than it does in response to a like temperature increase at low temperatures. It however occurs that in the typical application of the bridge circuit herein shown, the response of the bridge circuit per se is itself non-linear, and that this non-linearity of the bridge is in a direction to counteract the non-linearity of the bulb. For example, as a temperature measuring device in aircraft, the voltage supply is typically 14 volts; but so as not to pass an unduly high value of current through the bulb it is necessary that the resistances 37 and 40 of the bridge circuit be each approximately 700 ohms. On the other hand the resistance 38 will have a value intermediate the range of variation of the resistance bulb, typically a value of approximately 95 ohms for the temperature range just noted above. The bridge is itself accordingly unsymmetrical with respect to the so-called delta arrangement of the coils and resistance 39, with the result that changes in the value of the resistance 36 cause the current to vary at a faster rate in the coil 5a than in the coil 5 and a contraction in the scale divisions at the upper end portion of the scale tends to result. For small temperature ranges of the order of 100° C. this non-linearity of the bridge counteracts the non-linearity of the bulb nearly exactly; for a temperature range of measurement of 220° C. however, the bridge tends to over-counteract the non-linearity of the bulb, but this over-counteraction of the bridge is easily corrected by inserting a resistance 42, typically about 50 ohms, in series with the coil 5a.

Thus, irrespective of the temperature range to be measured, there will occur substantially equal arithmetical changes in the ratio of the currents in the field coils in response to equal changes in temperature of the resistance bulb. In order that this linear variation in the ratio of the currents with change in temperature may result in a uniform scale calibration, it is very important that there be obtained a linear torque deflection characteristic between the magnet and each field coil through the operating deflection range of the magnet.

In accordance with the teachings of my abovementioned pending application, I am enabled to flexibly control the shape of the torque deflection characteristics between the magnet and respective field coils, and to obtain a linear torque deflection characteristic over a wide angular range of deflection of the magnet. This control is effected by offsetting the respective field coils from the pivot axis of the magnet and using a bar magnet which is asymmetrically shaped relative to its pivot axis. (It may here be noted that I use the term "bar" with respect to the magnet as including shapes of generally bar form wherein the respective dimensions are not uniform but wherein the mean length dimension is substantially greater than either the mean width or mean thickness dimensions, and that I apply the term "non-symmetrical with respect to the pivot axis" to the magnet as meaning that the portions of the magnet diametrically opposite the pivot axis do not correspond in size, shape or relative disposition.) In the present meter it is found that such linear torque deflection characteristic may be obtained with the simplest and most economical form of coil—i. e., flat circular coils wound on cylindrical core pieces—and with a non-symmetrical magnet having the simplest shape for economical production—i. e., one having flat surfaces on all sides.

The magnet I preferably consists of a single solid piece of a highly efficient and permanent magnetic material such as that known commercially as "Alnico." This magnet has its pole end faces terminating on lines at right angles to its magnetic axis, but one pole end face is made wide and thin, while the other is made relatively narrow and thick, the ratio in the respective dimensions of the pole faces being typically of the order of 3:1. Also, the broad pole end of the magnet is made substantially shorter in length with respect to the pivot axis than is the narrow pole end, the respective lengths being approximately in the ratio of 2:3. The variation in the widths of the pole end faces causes the flux emanating from the poles to be distributed over angles of different width; on the other hand, variation in the lengths of the pole ends and in the thicknesses of the pole end faces affects primarily the strengths of the respective magnetic fields emanating from the pole ends. For obtaining a linear torque characteristic between the magnet I and respective field coils 5 and 5a it is a first requirement that the flux fields emanating from the respective pole ends be properly relatively distributed and that the strengths of those fields be in proper relationship. It is therefore important that the respective lengths of the pole ends and the widths and thicknesses of the pole end faces be each established in proper relationship to each other.

It is a further requirement for obtaining a linear torque characteristic that the distribution and strength of the useful flux field emanating from the sides of the magnet between the pole ends be properly established. To this end, it is required that the shape of the intermediate portion of the magnet relative to that of its ends shall also be properly established. Allied with this requirement are design factors to be met due to the presence of leakage flux, for this flux is carried by the intermediate portion of the magnet to the exclusion of the pole ends, and the intermediate portion of the magnet must therefore have a greater area of cross section than the pole ends so that it will be able to carry both the useful and leakage flux at the proper flux density for the magnetic material used, else an efficient design will not result giving the maximum useful flux per unit of weight of the magnet. It is found that these requirements for proper distribution of useful flux between the pole ends and for maximum generation of useful flux per unit of weight of the magnet are fulfilled when the sides of the magnet are made straight from pole face to pole face, giving the magnet a trapezoidal shape as viewed along its axis, and when the thickness of the magnet is uniform from its narrow pole end face to approximately midway its length and is from there tapered evenly in thickness so that the area of its broad end face will be comparable, or preferably slightly greater, than the area of its narrow end face. A magnet of this general shape has the desired greater area in cross section at the center than at the pole ends and has the desired feature of having flat surfaces on all sides permitting the magnet to be made economically in production.

A set of representative approximate dimensions for the meter are as follows: The magnet may be made of the type of Armco manufactured by the Indiana Steel Products Company known as "Red Streak" and may have a width and thickness at the broad pole end face of .414" and .024" respectively, a length of broad pole end face from the pivot axis of .175", a width and thickness of the narrow pole end face of .14" and .06" respectively, a length of narrow pole end face from the pivot axis of .297", and a taper of the broad pole end relative to the bottom face of the magnet of 8°40'. Each field coil may have a thickness of ⅛" and may have inside and outside diameters of ⅜" and $\frac{23}{32}$" respectively and as such, when wound of #39 single enameled wire, will have approximately 1500 turns and a resistance of 155 ohms; these coils are spaced with their peripheries at approximately $\frac{1}{16}$" from the pivot axis. The thickness of the damping plate 9 may be $\frac{1}{32}$". The thickness of the bottom shield member 22 may be $\frac{1}{16}$" and the diameter of the center hole 24 therein may be $\frac{5}{16}$". The overall thickness (axial length) of the shield case may be ¾" and the outside diameter of the case may be 2¼".

In Figure 8, the curves 45 and 46 represent the torque deflection characteristics obtained between the magnet 1 and respective field coils 5 and 5a for the condition of equal current-energization of the coils and the relative polarization of the coils as is obtained in the bridge circuit of Figure 7. For example, curve 45 represents the torque exerted by coil 5 on the magnet in a clockwise direction (as viewed from the top of the meter) through a 180° deflection range of the magnet from the zero position thereof wherein the broad end of the magnet is directed toward that coil; similarly, curve 46 represents the torque exerted by coil 5a on the magnet in a counter-clockwise direction through a 180° deflection range extending from the zero position of the magnet wherein the broad end of the magnet is directed toward that coil. These curves are substantially linear over 130° deflection ranges from the abovementioned zero positions of the magnet. In the deflection ranges in which the linear portions of the curves overlap, the ratiometer will function in the bridge circuit of Figure 7 to give a uniform scale calibration.

It may be noted that the torque curves 45 and 46 shown in Figure 8 are those obtained when the voltage of junction 41 in the bridge circuit is midway the voltages of the junctions at the extremities of resistance 39. For this condition the opposing torques exerted on the magnet by the two field coils are in balance when the magnetic axis of the magnet is midway between the two field coils, the pointer being then at the center of the scale as shown in Figures 1 and 2. As the resistance 36 decreases, the slope of curve 45 increases and that of curve 46 decreases with the result that the opposing torques balance at positions of the pointer at the lower end of the scale; vice versa, as the resistance 36 increases, the slope of curve 45 decreases and that of curve 46 increases with the result that the opposing torques balance at positions of the pointer at the upper end of the scale.

The driving torque for the ratiometer—i. e., the torque exerted on the magnet to restore it to a position of balance once the magnet is deflected from such position—is dependent upon the slope of the torque deflection characteristics, the torque being greater when the slope is greater and vice versa. Upon increasing the value of the resistance 39 in the bridge circuit, the driving torque is made greater because as the resistance is increased the potential drop across the field coils is increased. But an increase in the resistance 39 contracts the length of scale for a given range of temperature measurement—i. e., decreases the length of scale per unit change in the condition being measured—for as resistance 39 increases a greater range of variation of resistance 36 is required to move the potential of junction 41 through the range of potential drop appearing across resistance 39; yet in response to that greater range of variation of resistance 36 the pointer is deflected through the same angular length of scale, this length being the angular span between the coils. An increase in the angular span between the coils however increases the length of scale obtained for a given range of temperature measurement without, in itself, affecting the driving torque. Thus it is desired that the coils have the maximum possible span within the limitations for obtaining a uniformly calibrated scale, for then the resistance 39 will have a maximum value and the maximum driving torque is obtained.

When an arcuate scale 32 is used as shown in the drawings, it is desired in practice that its angular length be limited to approximately 70°. Since the linear portions of the torque deflection characteristics are approximately 130° long, these linear portions will overlap through a deflection range of 90°, giving a uniformly calibrated scale with a margin of 10° at each end, when the coil axes are spaced 170° about the pivot axis, as shown. When the coils are so widely spaced, the value of resistance 39 required for a 100° temperature range is typically 30 ohms.

It may be noted that the specific dimensions above given for the magnet and coils are not unduly critical, and that this is particularly true of the coils when they are located by their peripheries as above described. It may also be noted that the diameter of the hole 24 in the bottom shield plate 22 is also not critical so long as it is of the order of a major fraction of the length of the magnet.

While I have herein particularly illustrated my invention as a D.-C. measuring instrument, the application of my invention to this and other types of meters will be apparent from the foregoing description to those skilled in the art.

While I preferably employ a one-piece construction for the magnet, it will be understood, as is particularly explained and shown in my above-mentioned pending application, that alternatively there may be used magnet constructions consisting only of permanent magnetic materials or consisting of unitary constructions of both permanent and non-permanent magnetic materials, and that I intend this broad meaning for the term "magnet construction" as used in the claims.

The embodiment of my invention herein shown and described is intended to be illustrative and not necessarily limitative of my invention, as the same is subject to changes and modifications without departure from the scope of my invention which I endeavor to express according to the following claims.

I claim:

1. In an electrical instrument: the combination of a pivoted permanent magnet construction having its magnetic axis extending crosswise to its pivot axis; a field coil offset from said pivot axis and having its polar axis at least substantially parallel to said pivot axis, said coil and magnet construction being offset along said pivot axis to lie closely adjacent to one another in partially overlapping relationship; and a shield for said instrument comprising a first magnetic plate normal to said pivot axis and lying adjacent the side of said coil opposite said magnet construction, a second magnetic plate normal to said pivot axis and at the side of said magnet construction opposite said coil, and a magnetic tubular part intervening said plates and concentric to said pivot axis, said second plate having a central opening therein permitting the removal of said magnet construction from said shield.

2. In an electrical instrument: the combination of a pivoted permanent magnet construction of generally bar shape having its magnetic axis extending crosswise to its pivot axis, said magnet construction being non-symmetrically shaped relative to its pivot axis with one pole thereof being wide and the other being relatively narrow; and a coil, having a non-magnetic core, for generating a magnetic field to exert a torque influence on said magnet construction, said coil being axially parallel to said pivot axis and positioned closely adjacent said magnet construction in partially overlapping relation thereto, and the periphery of said coil being closely adjacent said pivot axis.

3. In an electrical instrument: the combination of a pivoted permanent magnet construction of generally bar shape having its magnetic axis crosswise to its pivot axis; and a flat coil wholly offset from said pivot axis and having its polar axis substantially parallel to said pivot axis, said magnet construction having one pole end thereof materially wider than the other pole end such that in one angular position of the magnet construction relative to the coil the two adjacent corners of opposite pole end faces of the magnet construction lie substantially at the periphery of said coil.

4. In an electrical measuring instrument: the combination of a pivoted permanent magnet construction of generally bar shape having its magnetic axis crosswise to its pivot axis; a flat circular coil wholly offset from said pivot axis and having its polar axis parallel to said pivot axis, said coil and magnet construction being offset along said pivot axis to lie closely adjacent one another in partially overlapping relationship; a magnetic plate normal to said pivot axis and adjacent to the side of said coil opposite said magnet construction, one pole end of said magnet being wider, thinner and shorter than the other pole end thereof, said non-symmetry of the magnet construction being adapted to produce a torque reaction between said coil and magnet construction, upon the coil being energized by a given fixed current, which varies substantially linearly over an angular range of deflection of the order of 90° or more.

5. A ratiometer comprising a pivoted magnet construction of generally bar shape, said magnet construction having the magnetic axis thereof substantially normal to its pivot axis, and said magnet construction further having a flat side normal to said pivot axis and an opposite side at least a part of which is inclined to said pivot axis whereby one pole end of the magnet construction is materially thicker than the other; a pair of flat coils offset from and axially parallel to said pivot axis, said coils being spaced about said pivot axis and positioned closely adjacent the flat normal side of said magnet construction in overlapping relation thereto; a thin non-magnetic disk of conducting material interposed between said coil and magnet construction; and a flat magnetic disk lying closely adjacent the sides of said coils opposite said magnet construction, said magnetic disk being parallel to the said flat normal side of said magnet construction.

6. An electrical instrument for measuring the ratio of two currents comprising a pivoted magnet, a pair of flat coils respectively energized by said currents, said coils being offset from the pivot axis of said magnet with their polar axes parallel to said pivot axis and being positioned closely adjacent one side of said magnet in partially overlapping relationship thereto; and a flat magnetic disk adjacent the outer sides of said coils for conducting useful flux from one pole to the other of said magnet past said coils, said magnet having a non-symmetry relative to its pivot axis adapted to produce a torque reaction between it and each of said coils, upon each coil being energized by a given fixed current, which is substantially linear through a deflection range of the order of 90° or more, and said coils being in substantially diametrically opposite positions relative to said pivot axis.

7. An electrical measuring instrument comprising a pivoted one-piece permanent magnet having a width and thickness at one pole end respectively greater and smaller than at the other pole end, the pole end faces of said magnet having comparable areas; and a coil mounted adjacent said magnet with its magnetic axis parallel to the pivot axis of the magnet, said coil being offset from said pivot axis and adjacent said magnet in partially overlapping relationship therewith.

8. An electrical instrument for measuring the ratio of two currents comprising a pivoted magnet, a pair of flat coils respectively energized by said currents, said coils being offset from the pivot axis of said magnet with their polar axes parallel to said pivot axis and being positioned closely adjacent one side of said magnet in partially overlapping relationship thereto; and a flat magnetic disk adjacent the outer sides of said coils for conducting useful flux from one pole to the other of said magnet past said coils, said magnet having a non-symmetry relative to its pivot axis adapted to produce a torque reaction between it and each of said coils, upon each coil being energized by a given fixed current, which is substantially linear through a deflection range of the order of 90° or more, and said coils being positioned about said pivot axis so that the linear portions of the respective torque-reaction characteristics between said magnet and said respective coils overlap within a range of deflection of the magnet.

GEORGE H. FRITZINGER.

REFERENCES CITED

The following references are of record in the file of this patent:

UNITED STATES PATENTS

| Number | Name | Date |
|---|---|---|
| 408,157 | Barrett | July 30, 1889 |
| 496,309 | Heinze, Jr. | Apr. 25, 1893 |
| 1,531,070 | Bruns | Mar. 24, 1925 |
| 2,002,445 | Arey et al. | May 21, 1935 |
| 2,102,409 | Faus | Dec. 14, 1937 |
| 2,147,482 | Butler | Feb. 14, 1939 |
| 2,260,026 | Hoare | Oct. 21, 1941 |
| 2,339,021 | Lingel | Jan. 11, 1944 |

FOREIGN PATENTS

| Number | Country | Date |
|---|---|---|
| 4,905 | Great Britain | 1876 |
| 295,714 | Great Britain | Nov. 4, 1929 |
| 516,452 | Great Britain | Jan. 2, 1940 |